US007530154B2

(12) United States Patent
Tamm

(10) Patent No.: US 7,530,154 B2
(45) Date of Patent: May 12, 2009

(54) METHOD OF MAKING A COMPRESSION CONNECTOR ASSEMBLY

(75) Inventor: Carl R. Tamm, Trussville, AL (US)

(73) Assignee: Hubbell Incorporated, Orange, CT (US)

(*) Notice: Subject to any disclaimer, the term of this patent is extended or adjusted under 35 U.S.C. 154(b) by 0 days.

(21) Appl. No.: 11/984,366

(22) Filed: Nov. 16, 2007

(65) Prior Publication Data

US 2008/0072991 A1 Mar. 27, 2008

Related U.S. Application Data

(62) Division of application No. 10/988,839, filed on Nov. 16, 2004, now Pat. No. 7,311,553.

(51) Int. Cl.
*B21D 39/00* (2006.01)
*B23P 11/00* (2006.01)

(52) U.S. Cl. ............................ 29/452; 29/458; 29/516; 29/517; 439/584

(58) Field of Classification Search .............. 29/402.04, 29/402.06, 402.14, 452, 458, 516, 517, 525.05; 439/584; 140/140
See application file for complete search history.

(56) References Cited

U.S. PATENT DOCUMENTS 2,158,892 A 5/1939 Becker et al.
2,279,508 A 4/1942 Bergan
2,533,343 A 12/1950 Bac
3,125,630 A 3/1964 Wahl
3,184,535 A 5/1965 Worthington
3,688,245 A 8/1972 Lockshaw
3,855,568 A 12/1974 Cochrane
3,955,044 A 5/1976 Hoffman et al.
4,252,992 A 2/1981 Cherry et al.
4,362,352 A 12/1982 Hawkins et al.
4,508,409 A 4/1985 Cherry et al.
4,813,893 A 3/1989 Sindlinger
5,002,503 A 3/1991 Campbell et al.
5,007,861 A 4/1991 Stirling
5,408,743 A 4/1995 Tournier et al.
6,241,553 B1 6/2001 Hsia
6,905,365 B1 6/2005 Liu
7,192,308 B2 3/2007 Rodrigues et al.

*Primary Examiner*—Jermie E Cozart
(74) *Attorney, Agent, or Firm*—Jenae C. Gureff; Mark S. Bicks; Alfred N. Goodman

(57) ABSTRACT

A compression connector assembly for securing a cable has a bushing insert and a gripping sleeve. The bushing insert includes a tubular bore, an exterior surface, a conductor receiving end, and a conductor engagement end. The gripping sleeve has an inner recess and an outer surface, and is adjacent to the conductor engagement end. The tubular bore and the inner recess are substantially coaxial, defining a cable securing passageway.

6 Claims, 5 Drawing Sheets

METHOD OF MAKING A COMPRESSION CONNECTOR ASSEMBLY

CROSS REFERENCE TO RELATED APPLICATIONS

This application claims the benefit of and is a divisional of U.S. Pat. Ser. No. 10/988,839, filed Nov. 16, 2004 now U.S. Pat. No. 7,311,553 B2. That application is hereby incorporated by reference in its entirety.

FIELD OF THE INVENTION

The present invention relates to a compression connector assembly which reduces the detrimental effects of aluminum oxidation on electrical connections. The compression connector includes a bushing insert for providing an electrically clean and intimate current path from a cable to the tubular bore of a bushing insert.

BACKGROUND OF THE INVENTION

A compression connector typically includes a hollow tubular section which is deformed with a special tool. The tool compresses the outer periphery of an electrical connector onto a stranded electrical conductor.

Typically, in transmission lines, stranded electrical conductors are utilized. Stranded electrical conductors have a steel core overlaid by one or more layers of conductive aluminum stranding. These cables have multiple layers of individual strands. The individual strands are laid in an opposite direction to an adjacent underlying layer, making each layer distinctive from its adjacent layer by its direction.

The advent of increasing power demands results in electrical connectors being operated at much higher current levels. Consequently, higher current levels result in much higher temperatures. The increased load on the electrical grid amplifies the current density and thermal stress of the entire system. Therefore, compression connectors, are weak links in the system, and are failing at an increasing rate.

The majority of failures occur in aluminum compression connectors and conductors. The reasons for these failures are two-fold. First, the vast majority of new connectors and conductors being installed are aluminum. Second, high integrity aluminum connections are difficult to achieve due to oxidation. Aluminum oxide is a highly effective electrical insulator, and is detrimental to the integrity of a compression connector on an aluminum conductor.

Aluminum has a very high chemical affinity with oxygen, causing aluminum oxide to form easily. By simply exposing aluminum to air, a very thin oxide film will form on the aluminum surface. As a result, oxide layers forming on both the cable and connector are a reason for concern. Conductivity of the electrical interface between the connector and the conductor is severely reduced when oxides are present.

The surfaces of the conductor stranding are continuously exposed to oxygen. Consequently, an oxide coating forms on the conductor stranding and must be penetrated during the installation process to form an electrical connection. Compression connectors only make contact with the outermost periphery of the conductor stranding and cannot physically access the inner layers. Thus, penetrating the oxide coating on the inner layers improves the integrity of the connectors.

Presently, the most effective method of cleaning the conductor is to unlay the strands of the outer layers. The inner layers are exposed and are cleaned by vigorous brushing. Consequently, the formation of tenacious, highly resistive aluminum oxide is reduced.

The problem with this cleaning method is that it is highly time consuming and very difficult to accomplish in the field. The process of unlaying the stranding of the conductor a sufficient distance from the end to allow cleaning of individual stranding is laborious and tedious. While this method is possible in a typical laboratory condition, where the conductor may remain supported and still, the method is often unsuccessful in the field. Performing the cleaning steps successfully on an aerial platform, such as a bucket truck, is highly improbable due to difficultly to dealing in handling the individual conductive strands. The strands must be held in a suitable manner to brush them with sufficient force to effectively remove the oxide layer. Therefore, this method typically is not done in the field.

In addition, difficulties arise when the strands are re-layered into their original position. Compression connectors are designed with minimal space to receive the design standard of the outer diameter of the conductor. Consequently, if the strands are not re-layered to provide the original diameter of the conductor as manufactured, the conductor cannot be inserted into the compression connector designed therefore.

Additionally, the above method does not solve the problem of the rapid formation of oxides. After the stranding is brushed and a large portion of the old oxide coating removed, new oxides form immediately on the clean surfaces exposed to oxygen. The newly formed oxides formed on the surface of the aluminum strands prevent the passage of current between the innermost strands of the conductor through each successive layer and the compression connector.

Another prior art cleaning method requires the use of an abrasive material such as a sand paper. The sand paper is wrapped about the periphery of each individual strand for abrading the oxide layer. However, the abrasive material will also wipe away the oil coating of the inhibitor designed to provide the oxygen barrier needed to prevent the re-growth of the oxide layer which the cleaner is attempting to remove.

Lastly, abrasive inhibitors are also used to enhance the electrical performance of connectors. During the compression process, a gritted inhibitor is forced hydraulically through interstitial spaces between the strands. The inhibitor abrades the oxide layer as it progresses. However, this method works well only on the outer layer. Rarely, does any significant amount of the gritted inhibitor find its way to the inner layer interstices. Thus, the current being carried by the inner layers of the conductor meets a high resistance interface. As a result, the outer layers have higher current densities and increase the temperature of the conductor, particularly at the connector interface.

While the aforementioned methods help to some degree, nonetheless a continuing recurrence of connector failures in electrical grid infrastructures necessitate improvements to enhance the integrity and longevity of the electrical connectors of the infrastructure.

Thus, a continuing need exists to provide improved compression connectors.

SUMMARY OF THE INVENTION

Accordingly, a primary object of the present invention is to provide a compression connector assembly and a method of securing a cable having a bushing insert for providing an electrically clean and intimate current path from all layers of conductor stranding to the tubular bore of the bushing insert and connector.

Another object of the present invention is to provide a compression connector assembly and method of securing a cable which are relatively simple to assemble, use, and replace in comparison.

A further object of the present invention is to provide a compression connector and method of securing a cable with improved performance by reducing the number of actual interfaces, thereby enhancing the integrity of the connection and providing assurance of a low resistance interface with each layer of conductor stranding.

Yet another object of the present invention is to provide a compression connector with a reduced size, the shorter compression connector assembly reducing extrusion and birdcaging of the conductor stranding.

The foregoing objects are basically attained by providing a compression connector assembly for securing a cable. The compression connector assembly includes a bushing insert and gripping sleeve. The bushing insert includes a tubular bore, an exterior surface, a conductor receiving end, and a conductor engagement end. The gripping sleeve has an inner recess and an outer surface. The gripping sleeve is adjacent to the conductor engagement end. The tubular bore and the inner recess are substantially coaxial and define a cable securing passageway.

The foregoing objects are also attained by providing a method of securing a cable having a plurality of conductive strands forming multiple layers to a full tension deadend or other compression connector. The method includes trimming the cable to expose at one underlying layer and a core layer, cleaning the underlying layer to remove any oxide coating, and placing a bushing insert over the underlying layer. The at least one underlying layer is disposed within an inner bore of the bushing insert. The core layer extends through the bushing insert and into an inner recess of a gripping sleeve. The bushing insert and gripping sleeve are then positioned within a full tension deadend. The full tension deadend is then laterally compressed for securing the cable thereto.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
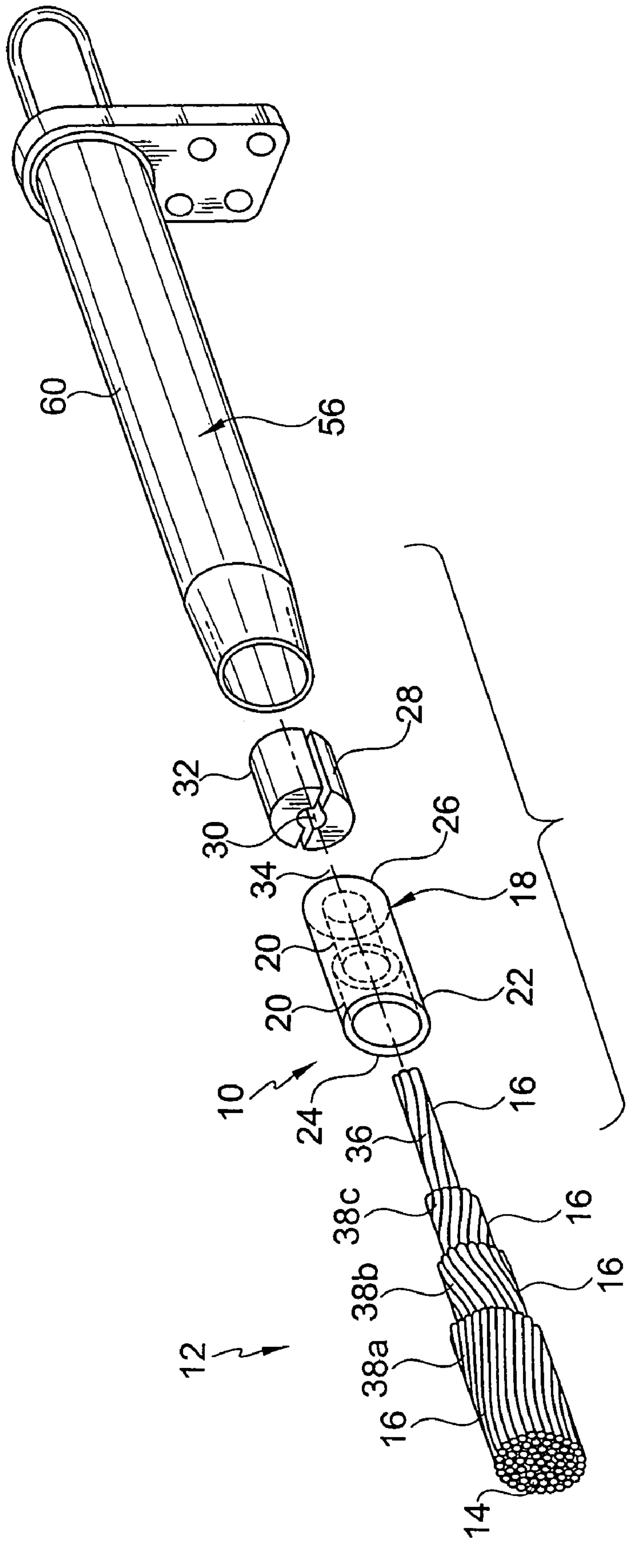
FIG. 1 is an exploded perspective view of a compression connector assembly according to a first embodiment of the present invention, with a multiple stranded conductor cable, a bushing insert, a gripping sleeve, and a full tension deadend.

Referring initially to FIGS. 1, 2, 4, and 9-10 a compression connector assembly 10 and a gripping sleeve 28 according to the present invention secures a cable 12 having a plurality of conductor stranding 14 forming multiple layers 16. The connector assembly 10 comprises a bushing insert 18. Bushing insert 18 has a tubular bore 20, an exterior surface 22, a conductor receiving end 24, and a conductor engagement end 26. Gripping sleeve 28 has an inner recess 30 and an outer surface 32, and is positioned adjacent to conductor engagement end 26. Tubular bore 20 and inner recess 30 are substantially coaxial and define a cable securing passageway 34.

As depicted in FIG. 1, the main purpose of compression connector assembly 10 is to secure high temperature conductors. Layers 16 of a typical composite conductor cable 12 include a steel core layer 36 of solid or stranded steel surrounded by outer aluminum layers 38*a*, 38*b*, and 38*c*. However, the cable 12 core layer 36 could be aluminum or any other suitable metal. Aluminum layers 38*a-c* have individual strands 14. Composite cables have multiple layers 16 of individual strands 14. Individual strands 14 in each layer extend helically about a central axis in an opposite direction to an adjacent layer 16, making each adjacent layer distinctive from one another. However, the assembly is capable of use with any type of conductor cable.

Figure 2:
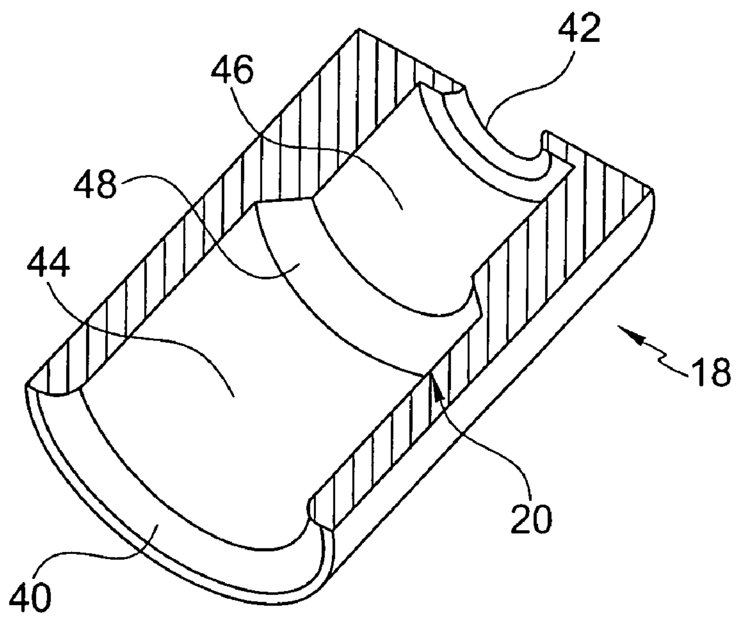
FIG. 2 is a perspective view in section of the bushing insert of FIG. 1.
Figure 4:
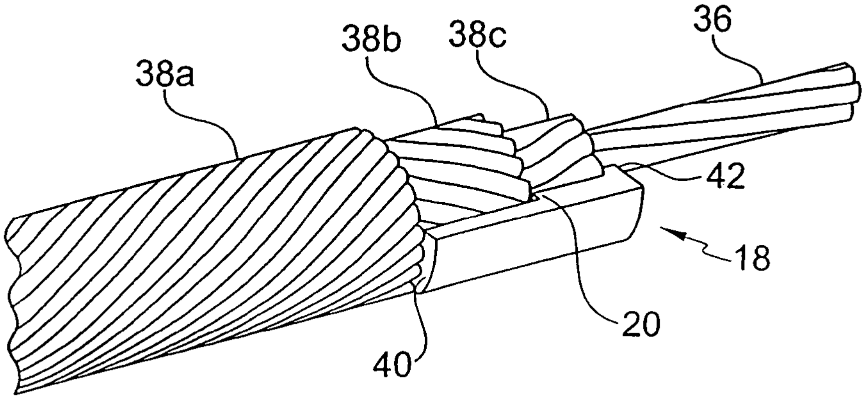
FIG. 4 is a partial cut away view of a bushing insert for the compression connector assembly according to a second embodiment of the present invention.

As best seen in FIGS. 1-2 and 4, bushing insert 18 of the present invention has a tubular bore 20 extending the entire length of bushing insert 18. The tubular bore terminates with a conductor receiving end aperture 40 on one side and a conductor engagement end aperture 42 on the opposite side. Tubular bore 20 receives at least the steel core layer 36 and at least one inner aluminum layer 38*c* (FIG. 4). Steel core layer 36 extends through conductor engagement end aperture 40. Inner aluminum layer 38*c* is positioned within tubular bore 20 for facilitating an electrically clean and intimate current path from cable 12 to tubular bore 20.

Tubular bore 20 has an axial length and cross-sectional diameter approximately equivalent to that of a corresponding layer 16 of stranding 14. Tubular bore 20 is preferably stepped. If stepped, tubular bore 20 has a first innermost diameter 44 substantially equal to the innermost aluminum layer 38*c* to which contact is made and a second innermost diameter 46 which is substantially equal to a second outer layer of aluminum 38*b* to which contact is made. Moreover, if a plurality of outer aluminum layers are necessary (e.g. 38*a*), additional steps will be provided.

Tubular bore 20 also includes a diameter transition portion 48. Diameter transition portion 48 forms a tapered section disposed between successive diameter steps of tubular bore 20 and tapers in a direction towards the exterior surface 22. Diameter transition portion 48 serves to guide the end of the strand layer into its respective bore.

As best seen in FIG. 1, gripping sleeve 28 comprises an inner recess 30 and an outer surface 32. The inner recess 30 extends the length of gripping sleeve 28 and includes apertures on either end of gripping sleeve 28. Inner recess 30 is substantially cylindrical and receives steel core layer 36. Inner recess 30 has a substantially uniform diameter.

Figure 3:
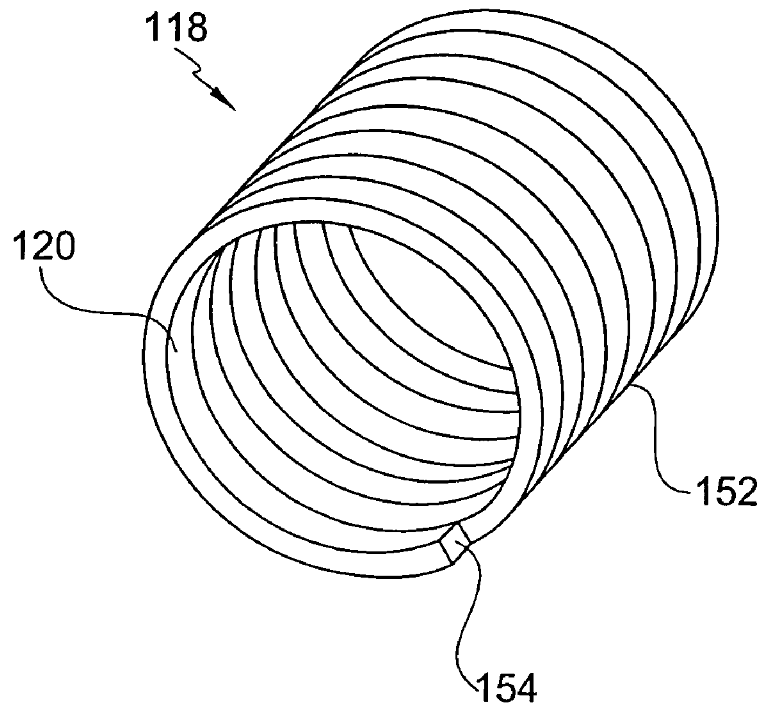
FIG. 3 is a perspective view of the bushing insert of FIG. 1.

According to a second embodiment of the invention, bushing insert 118 is depicted in FIG. 3. Tubular bore 120 of the bushing insert 118 is defined by a helically formed wire 152. Helically wound wire is preferably made of rectangular cross-section 154. However, the wire may be of any polygonal cross-section or could be made from a single piece of tubular material. Bushing insert 118 is capable of use with conductor stranding 14 having only two layers. The bushing insert 118 is sufficient to displace one layer of stranding.

Figure 5:
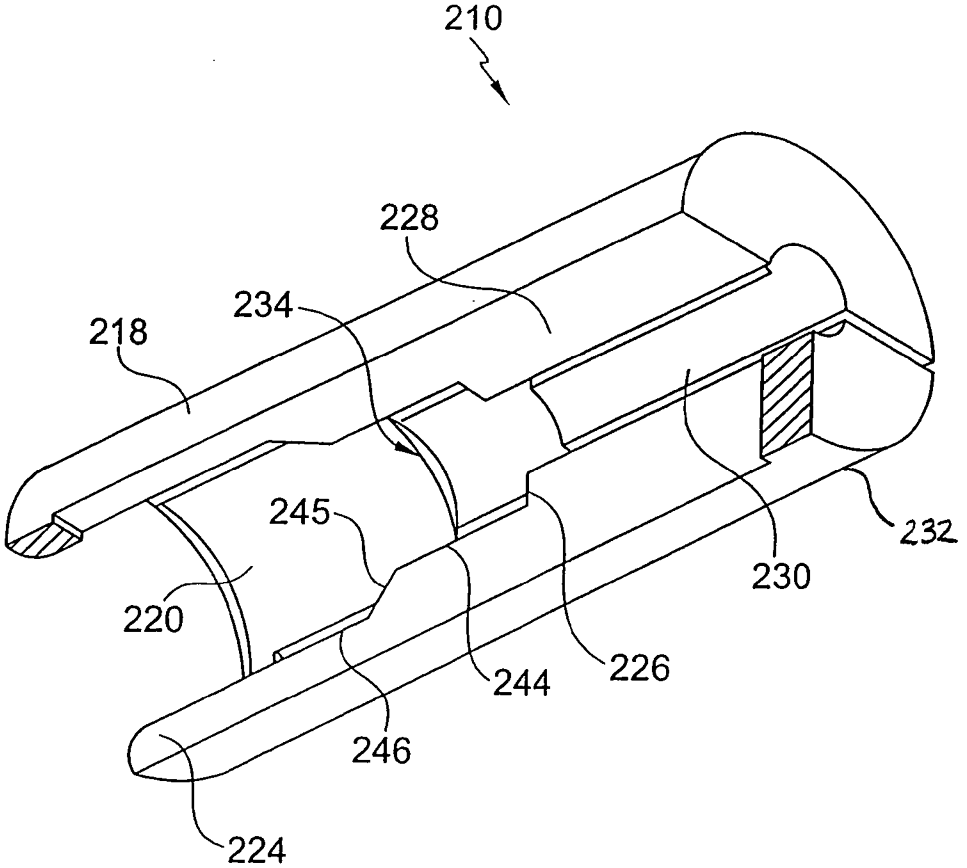
FIG. 5 is a perspective view in section of a unitary bushing insert and gripping sleeve for the compression assembly according to a third embodiment of the present invention.

According to a third embodiment of the invention, FIG. 5 illustrates a unitary, one-piece compression connector assembly 210. Bushing insert 218 and gripping sleeve 228 are positioned substantially coaxial such that tubular bore 220 and inner recess 230 form a continuous cable securing passageway 234. Bushing insert 218 includes a conductor receiving end 224 and a conductor engagement end 226. Positioned between conductor receiving end 224 and conductor engagement end 226 is an inner diameter portion 244 and an outer diameter portion 246. A tapered diameter transition portion 245 extends outwardly from the inner diameter portion 244 to the outer diameter portion 246 and serves to guide the end of the strand layer into its respective bore.

Gripping sleeve 228 has an inner recess 230 and an outer surface 232, and is positioned adjacent to conductor engagement end 226. The unitary, one-piece compression connector assembly 210 reduces the number of parts required for assembly. Consequently, manufacturing and inventory costs are reduced, while assembly is facilitated.

Figure 6:
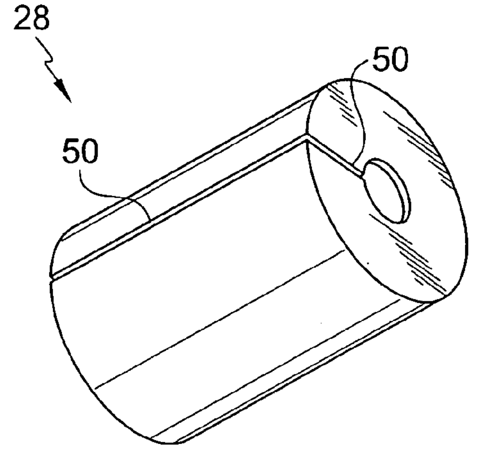
FIG. 6 is an alternative embodiment of the gripping sleeve of FIG. 1 having an axial slot for facilitating compression.
Figure 7:
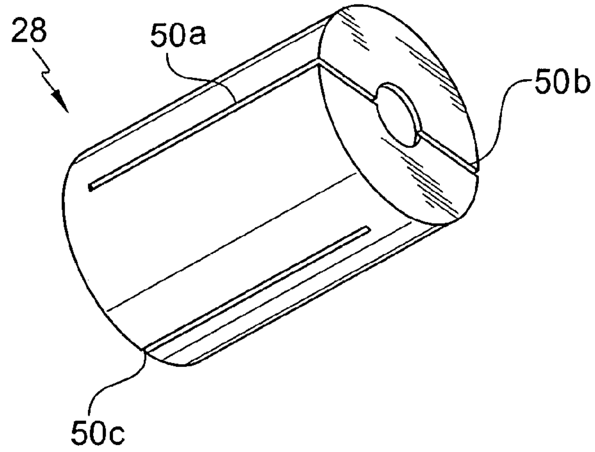
FIG. 7 is a perspective view of the gripping sleeve of FIG. 1 having a plurality of axial slots.
Figure 8:
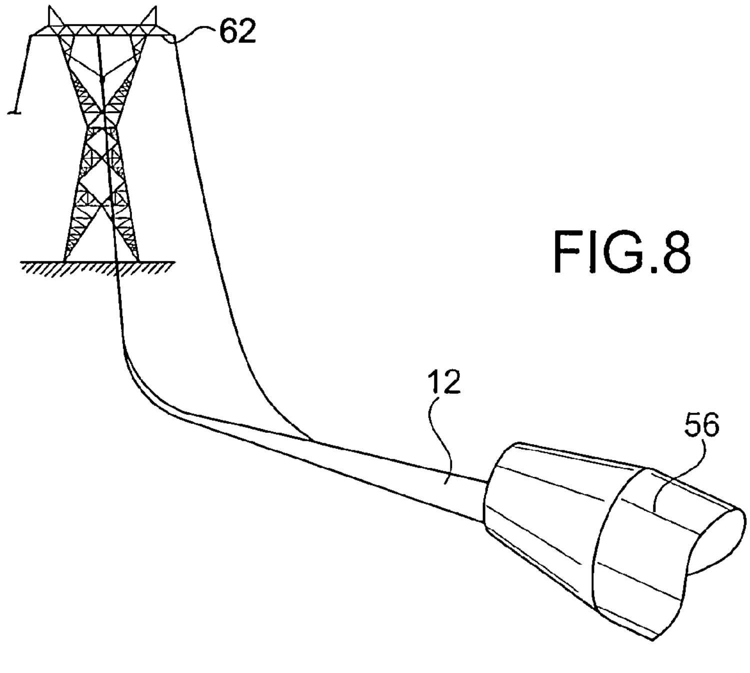
FIG. 8 is a perspective view of the compression connector assembly of FIG. 1 connecting a full tension deadend to a transmission line.
Figure 9:
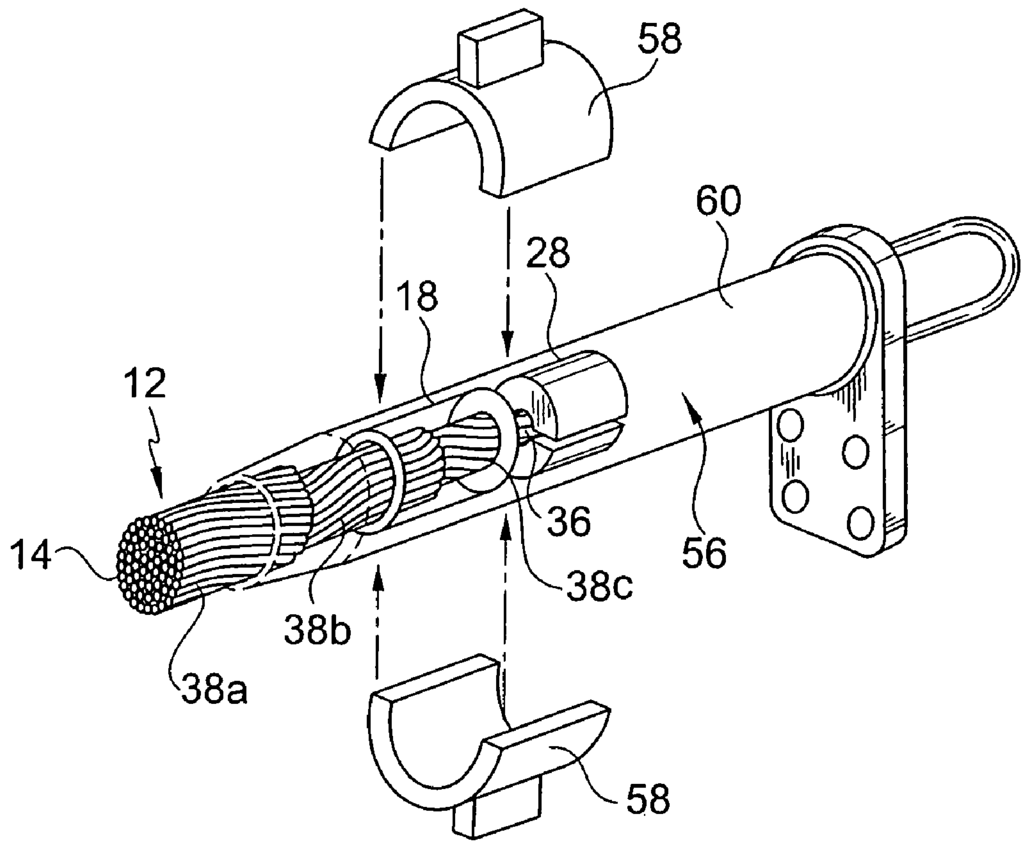
FIG. 9 is a perspective view of the compression connector assembly of FIG. 1 prior to compression within the full tension deadend.
Figure 10:
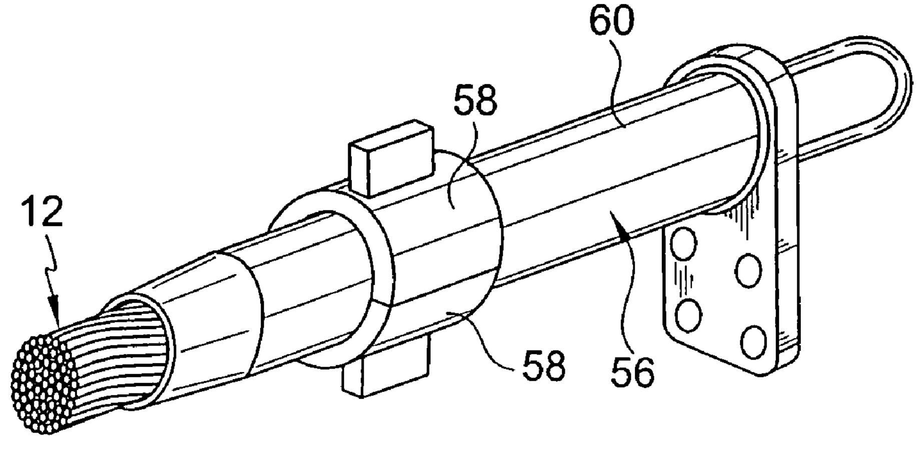
FIG. 10 is a perspective view of the compression connector assembly insert of FIG. 1 during compression within the full tension deadend.

In FIGS. 6-7, two alternate embodiments of the gripping sleeve 18 depicted in FIG. 1 are illustrated. In FIG. 6, a gripping sleeve 28 is provided with an axial slit 50 for minimizing the compressive forces necessary for deformation. In FIG. 7, a gripping sleeve 28 having a plurality of slits 50*a-c* is illustrated. Two of slits 50*a-b* are axially disposed and split one end of the gripping sleeve. Slits 50*a-b* terminate proximate to an end of the gripping sleeve 28. Slit 50*c* is axially disposed and splits the opposite end of the gripping sleeve 28 from slits 50*a-b*.

Slits 50*a-c* also minimize required compressive forces. The number of slits 50, 50*a-c* utilized will be determined by the overall diametrical size of the gripping sleeve 28. Slits 50, 50*a-c* may be axially, transversely, or helically positioned on the gripping sleeve 28. Although not illustrated, slits 50, 50*a-c* could be also be used with the unitary compression connector assembly 210 of FIG. 5.

Bushing insert 18 is generally manufactured by one of impact extrusion, cutting, milling, or swaging of metal stock. Bushing insert 18 can be made from any conductive metal or metal alloy (e.g. copper, aluminum, nickel, etc.) Preferably, bushing insert 18 is substantially cylindrical in shape. However, bushing insert 18 may be any polygonal shape or combination of polygonal shapes.

Gripping sleeve 28 is manufactured by one of impact extrusion, cutting, milling, or swaging of metal stock. Gripping sleeve 28 can be made from any conductive metal or metal alloy (e.g. copper, aluminum, nickel, etc.), but preferably from aluminum.

Prior to use, bushing insert 18 tubular bore 20 and gripping sleeve 28 inner recess 30 should be brushed and prepared to remove oxides and inhibit their reformation. Additionally, tubular bore 20 and inner recess 30 may also be provided with any number of textures known in the art for disrupting or prohibiting oxide formation.

Operation

As best seen in FIGS. 1 and 8-10, compression connector assembly 10 is utilized for securing cable 12 from a transmission tower 62 to a full tension deadend 56. The method first requires trimming cable 12 to expose steel core 36 and at least one aluminum layer 38. Exposed steel core layer 36 and outer aluminum layer 38 are then cleaned to remove any oxide coating. Bushing insert 18 is then placed over each layer 36, 38 so that the steel core layer 36 extends through bushing insert 18 and inner aluminum layer 38 is positioned within tubular bore 20. Steel core layer 36 is then inserted into inner recess 30. Gripping sleeve 28 is positioned adjacent conductor engagement end 26 prior to insertion within full tension deadend 56. After positioning compression connector assembly 10 within full tension deadend 56, a hydraulic press 58 (FIGS. 9-10) is utilized to laterally compress the full tension deadend 56 and secure cable 12.

The first step of trimming cable 12 is necessary in order to expose steel core layer 36 by paring back stranding 14. More specifically, outer aluminum layers 38*a-c* are pared back to expose steel core layer 36 using conventional tools. The tools operate in the same fashion as a pipe or tube cutter. The tools have a specially designed bushing guide that fastens to the conductor, serving to maintain the positional alignment of a rotary cutting wheel that circumscribes the conductor as it is rotated about its periphery and is pressed deeper with successive rotations. After the tool cuts through first outer aluminum layer 38*c*, it progresses deeper through successive layers until all of outer aluminum layers 38*a-b* are severed, exposing the steel core layer 36. The bushing guide is then repositioned to a predetermined distance dependant on the type of construction of the conductor, and a second trim cut is made, but this time only cutting deep enough to expose the innermost layer of conductive stranding which overlays the steel core. If the conductor is of the larger sizes consisting of three layers of conductive stranding, a third trimming operation is made, again at a predetermined distance, removing only the outer layer of stranding and exposing the intermediate layer.

The next step is to clean outer aluminum layers 38*a-c*, and bushing insert 18 with an oxide inhibitor. The exposed aluminum layers 38*a-c* should be brushed prior to installation of bushing insert 18. Brushing serves to remove visible dirt and grime, while removing a heavy portion of the oxide layer. A liberal amount of inhibitor is then be applied to exposed aluminum layers 38*a-c*. The grease compound serves to protect the immediate surface and inhibit oxygen from contacting it, thereby inhibiting the oxide layer growth.

The inhibitor contains grit, serving as an abrasive agent. As the grit bearing inhibitor is forced through layers 16 of conductor strands 14 under hydraulic pressure created during compression, it abrades the surface of strands 14 and tubular bore 20 cleaning out the oxide layer as it moves. The grit bearing inhibitor also serves to protect and aluminum surfaces 38*a-c* from oxygen so the oxide does not reform. Thus, clean metal to metal contact is made between tubular bore 20 and cable 12.

Once cable 12 is properly trimmed, cleaned, and coated with the appropriate inhibitor, bushing insert 18 is inserted over the exposed outer aluminum layers 38*b-c*, occupying the space previously occupied by the now trimmed layers of stranding 14. Bushing insert 18 serves to provide an interface between tubular bore 20 and cleaned exposed inner aluminum layer 38*c*.

Gripping sleeve 28 is placed over exposed steel core layer 36 of the cable 12. Compression connector assembly 10 is inserted into a body portion 60 of full tension deadend 56. Body portion 60 is then crimped onto the gripping unit with a hydraulic press 58 (e.g. circular die press, uni-grip single die compression, or conventional two-die compression assemblies) resulting in an elliptical shaped crimp section. The crimping is continued to the end body portion 60, completing the method for securing cable 12 with compression connector assembly 10.

While various embodiments have been chosen to illustrate the invention, it will be understood by those skilled in the art that various changes and modifications can be made therein without departing from the scope of the invention as defined in the appended claims.

What is claimed is:

1. A method of securing a cable having a plurality of conductive strands forming multiple layers to a full tension deadend, comprising:

trimming the cable to expose at least one underlying layer and a core layer;

cleaning the underlying layer to remove any oxide coating;

placing a bushing insert over the at least one underlying layer so that the underlying layer is disposed within an inner bore of the bushing insert;

inserting the core layer into an inner recess of a gripping sleeve;

positioning the bushing insert and the gripping sleeve within a full tension deadend;

laterally compressing the full tension deadend, the bushing insert, and the gripping sleeve for securing the cable thereto.

2. A method of securing a cable, according to claim 1 wherein the trimming step includes trimming the cable to expose at least one aluminum layer and a steel core layer.

3. A method of securing a cable, according to claim 1 wherein the trimming step further includes utilizing a cable trimmer to expose the at least one underlying layer and core layer.

4. A method of securing a cable, according to claim 1 wherein the cleaning step further includes cleaning and coating the exposed underlying layers with an oxide inhibitor.

5. A method of securing a cable, according to claim 1 wherein the compression step further includes compressing an exterior surface of the bushing insert and a outer surface of gripping sleeve with a fluid compression press for securing the cable.

6. A method of securing a cable, according to claim 1 wherein the compression step further includes utilizing a hydraulic compression press.

* * * * *